United States Patent [19]

Uhing

[11] Patent Number: 4,573,367
[45] Date of Patent: Mar. 4, 1986

[54] CLOSED ROLLING NUT FOR TRANSFORMING A ROTARY MOVEMENT OF A SHAFT INTO A THRUST MOVEMENT OF THE ROLLING NUT

[76] Inventor: Joachim Uhing, Dorfstede 34, D-2301 Molfsee, Fed. Rep. of Germany

[21] Appl. No.: 574,563

[22] Filed: Jan. 27, 1984

[30] Foreign Application Priority Data

Jan. 27, 1983 [DE] Fed. Rep. of Germany ....... 3302633

[51] Int. Cl.$^4$ ............................................. F16H 21/16
[52] U.S. Cl. ............................................. 74/89; 74/25
[58] Field of Search ....................................... 74/25, 89

[56] References Cited

U.S. PATENT DOCUMENTS

| | | | |
|---|---|---|---|
| 3,443,443 | 5/1969 | Spence | 74/25 |
| 3,903,748 | 9/1975 | Krogsrud | 74/25 |
| 4,018,256 | 4/1977 | Niehaus et al. | 144/238 |
| 4,141,255 | 2/1979 | Nilsson | 74/25 |
| 4,253,342 | 3/1981 | Uhing | 74/89 |

FOREIGN PATENT DOCUMENTS

| | | | |
|---|---|---|---|
| 34388 | 8/1981 | European Pat. Off. | 74/89 |
| 1905529 | 10/1969 | Fed. Rep. of Germany | 74/89 |

Primary Examiner—Samuel Scott
Assistant Examiner—Allen J. Flanigan
Attorney, Agent, or Firm—Michael J. Striker

[57] ABSTRACT

The rolling nut for transforming a rotary movement of a smooth shaft into a thrust movement of the nut comprises a tubular housing in which a number of roller cages defining a center passage for the shaft and engaging an arcuate surface portion of the shaft are arranged. The roller cages are inclined to the axis of the shaft and to each other. Wedge-shaped distance rings are arranged between the neighboring roller cages and laterally of the end roller cages. The roller cages and the distance rings are interchangeable within the housing so that the direction of the angle of inclination of each roller cage within the housing can be varied.

12 Claims, 7 Drawing Figures

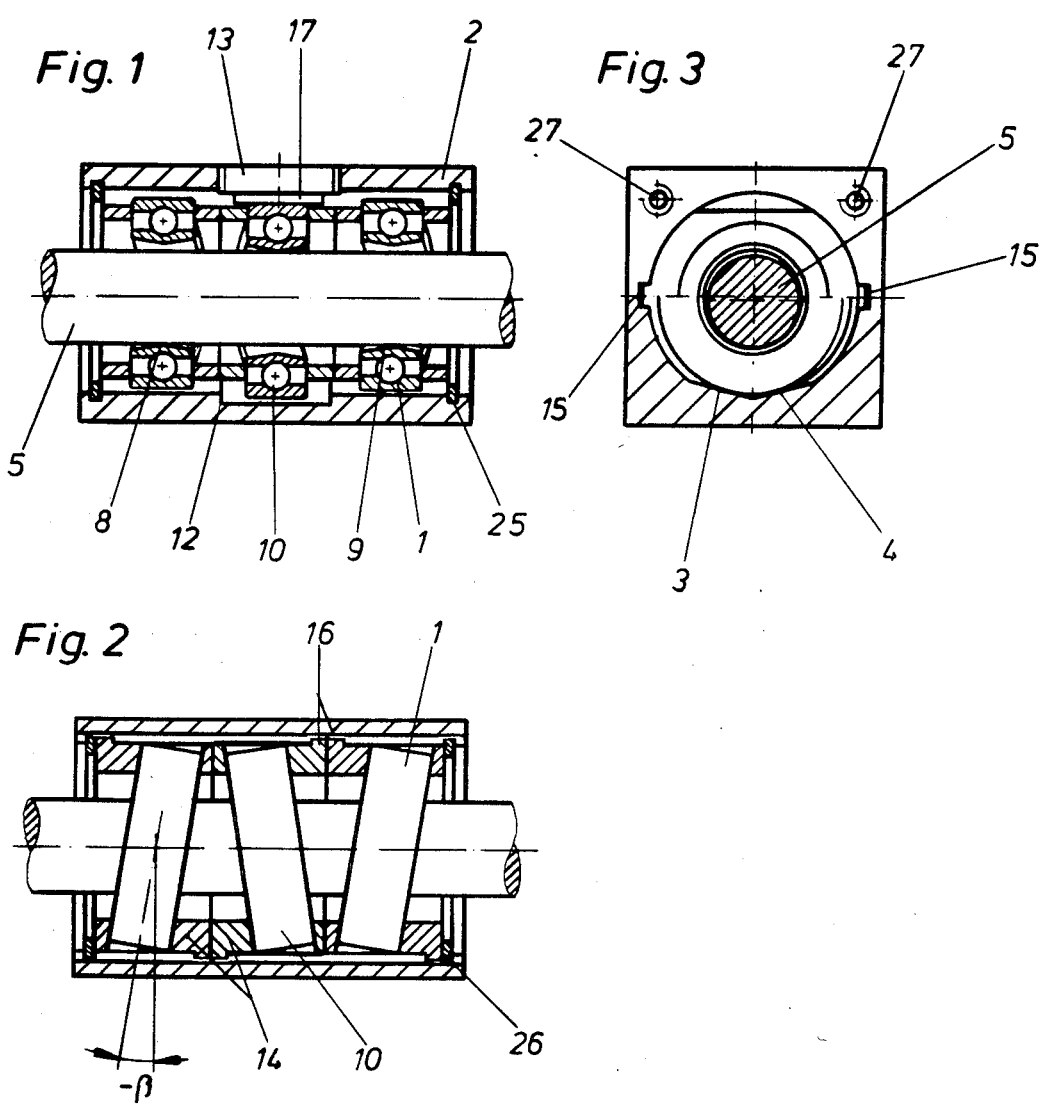

CLOSED ROLLING NUT FOR TRANSFORMING A ROTARY MOVEMENT OF A SHAFT INTO A THRUST MOVEMENT OF THE ROLLING NUT

BACKGROUND OF THE INVENTION

The present invention relates to an arrangement which includes a roller nut in conjunction with a smooth shaft and is operative for transforming a rotary movement of the shaft into a thrust movement of the roller nut.

Roller nuts of the type under consideration are known in the art. These roller nuts include a plurality of roller rings or cages which surround the shaft at different angles to each other. The inner surfaces of the roller cages are in pressure contact with the outer surface portions of the shaft. One of such roller nuts is disclosed in Applicant's U.S. Pat. No. 4,253,342. Rolling or contact surfaces on the shaft and the roller rings or cages and the inclination of the roller rings relative to each other are so selected that the rolling tracks of the roller rings describe on the shaft a uniform helical line. The roller rings are accommodated in a two-part housing which is provided with corresponding grooves receiving the roller rings and with an elastic element which serves for generating pressure forces or friction contact between the rings and the shaft. These roller nuts have a high accuracy, but in many instances they are too expensive and too special. For example, with the above-described construction, it is impossible to readjust the screw transmission from the left hand direction to the right hand direction and to a different angle of inclination. It is also disadvantageous that the housing is comprised of two parts which must be repeatedly readjusted and screwed to each other.

SUMMARY OF THE INVENTION

It is an object of the present invention to provide an improved roller nut in which the known transmission mode would be simplified and in which structural elements required for the execution of a desired transformation of the rotary movement of the shaft into the thrust motion of the nut can be easily assembled, without requiring complicated housing portions with bolt and compressing elements.

In pursuance of the above object, and others which will become apparent hereafter, one feature of this invention resides in a rolling nut in combination with a smooth shaft for transforming a rotary movement of the nut, comprising a tubular housing; a plurality of annular roller cages arranged in said housing and surrounding said shaft, said roller cages being arranged in said housing at an angle to each other and to an axis of the shaft, each roller cage having an inner annular surface engageable with an outer surface portion of said shaft; and a plurality of distance rings arranged in the housing and respectively interpositioned between neighboring roller cages, said roller cages and said distance rings being interchangeable in the positions thereof in said housing so that the direction of inclination of said roller cages to the axis of the shaft can be changed and the roller cages can be adjusted to a desired direction of the thrust movement.

Two lateral roller cages and at least one intermediate roller cage therebetween may be arranged in the housing.

The housing has an inner surface which may be formed with supporting portions on which said lateral roller cages are supported without pressure.

Each of the distance rings may be wedge-shaped.

Each of the distance rings has two lateral opposite surfaces, said opposite surfaces may include therebetween an angle corresponding to a pitch angle of the thrust movement of the nut.

Two wedge-shaped distance rings may be positioned between the intermediate roller cage and each of the lateral roller cages.

The housing has two opposite end portions, each of said end portions may enclose one of the distance rings, said one distance ring being arranged in contact with a respective lateral roller cage.

The rolling nut may further include means for producing a thrust force in the rolling nut, said means being applied on said intermediate roller cage. This means may include a pressing bolt and a pressure-distributing elastic intermediate member positioned between the pressing bolt and the intermediate roller cate. Alternatively, this means may include a trapezoidal flat spring arranged in contact with the intermediate roller cage.

The housing may have at the end portions annular grooves. Spring rings may be inserted in those grooves, which are play-free secured in the grooves.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a side sectional view of the rolling nut according to the invention in which three roller rings are adjusted to a right hand thread or pitch;

FIG. 2 is a plan view, partially in section of FIG. 1;

FIG. 3 is a sectional view along line 111—111 of FIG. 1;

DETAILED DESCRIPTION OF THE PREFERRED EMBODIMENTS

Figure 4:
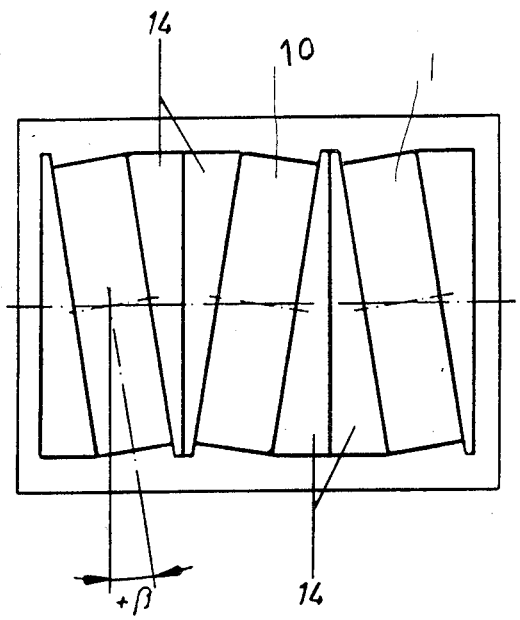
FIG. 4 is a plan view of the roller nut with four roller rings arranged with a left hand inclination or pitch.

In assembly of roller nuts of the type under discussion, two requirements have been defined in practice. Firstly, the construction of the roller nut must be adjusted to structural conditions of the machine or apparatus and secondly, the direction of inclination or pitch of the roller rings, necessary for transformation of the movement, should be varied independently from the external structure of the roller nut. Due to a separation of structural requirements depending on the position of the rings and depending on the inclination or pitch of the roller rings a plurality of variants of constructions of the roller nuts are possible.

FIG. 1 illustrates the embodiment in which a tubular housing is identified by a reference character 2. It is not required that both lateral roller rings 1 be clamped in housing 2 over the entire periphery thereof; it is sufficient that roller rings 1 are supported against the inner surface of the tubular housing in two contact points 3 and 4 in order to ensure the position of the roller rings 2 transversely to a shaft 5 which extends through the roller rings or cages in the known fashion. Both contact points 3 and 4 lie on the respective straight supporting face portions 6 and 7 provided on the inner surface of the housing; these faces, formed by chords of circular segments of the housing profile, are so selected that contact points are located so far away from each other that a stable position of the respective lateral roller ring 1 is obtained. Laterally of these contact points shaft 5 contacts the inner surface of roller rings 1 in rolling points 8 and 9 whereby the stable position of the shaft relative to the housing 1 is also obtained.

Contact point 11, at which the shaft 5 contacts the intermediate roller ring 10, is offset about 180° relative to the contact points 8 and 9. The housing in the region of the intermediate roller ring or cage has a circular recess or release portion, in which a pressing bolt 13 is inserted, which is pressed against the shaft so that the housing has no more contact with the shaft at any other points. The inclination of the roller cages relative to the axis transverse to the axis of the shaft, is defined by a pitch angle $-\beta$ or $+\beta$ in FIGS. 2 and 4. The transformation of the rotary movement of shaft 5 into the thrust movement of the roller nut according to a left hand thread or a right hand thread is described in detail in Applicant's U.S. Pat. No. 4,253,342, the entire disclosure of which is incorporated herein by reference.

Figure 5:
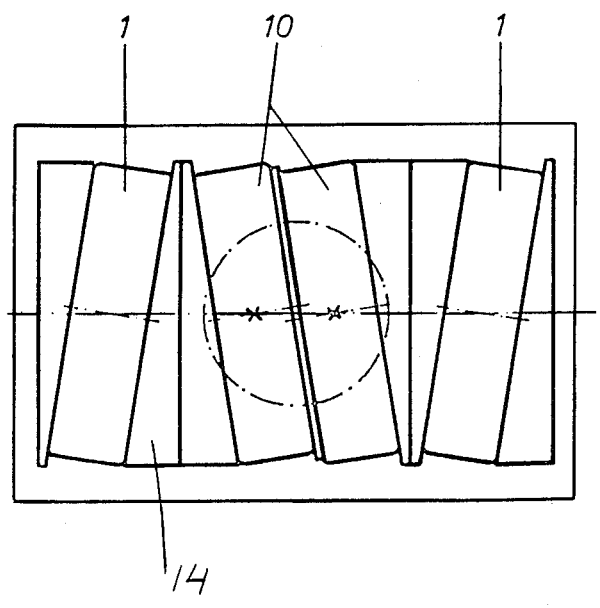
FIG. 5 is a plan view of the roller nut with four roller rings arranged with a right hand inclination or pitch.

The necessary angle of inclination of the respective roller cage to the axis of the shaft is obtained by means of distance rings 14 which are inserted between each two adjacent roller cages as shown in FIG. 2 for the right hand inclination or in FIG. 4 for the left hand inclination. As can be seen from the drawings, the same number of distance rings 14 are used not only for roller nuts with three roller cages for both manners of inclination but also for roller nuts having four roller cages as shown in FIG. 5, because the wedge angle of the single distance rings corresponds to the pitch angle $\beta$. The distance rings 14 limiting the roller cages 1 and 10 are formed as wedge-shaped elements. To change the inclination of the roller cages, the positions of the wedge-shaped distance rings 14 are merely changed. A very small angle of inclination, such as fractions of one degree, can be also obtained in a simple manner, which with usual form-locking threads is possible with great difficulties. The distance rings must be so formed that, after they have been once inserted into the housing, their position in that housing should be maintained. In the preferred embodiment, opposite grooves 15 are formed in housing 2; projections 16 provided on the wedge-shaped distance rings 14 are engaged in grooves 15. The distance rings 14 can be also formed such that they would tightly surround shaft 5 but would be only slightly or not at all braked. This effect can be obtained by selection of a suitable material for the distance rings and by the certain configuration of these rings, particularly if, in addition, a lubricating material for lubricating these rings would be inserted in special depressions provided for that purpose in the distance rings.

The pressing bolt 13 is utilized for producing contact pressures which are necessary for a friction contact between the roller cages 1, 10 and shaft 5. An elastic means 17, which serves as a pressure storage, is interconnected between the pressing bolt 13 and the outer ring of intermediate roller cage 10. The elastic means 17 allows to adjust the contact pressures to various forces. This elastic means may be disc springs, rubber springs or any similar elements. Such elastic means can be provided only on one roller cage 10, as seen in FIG. 1, for the roller nut with three roller cages or on two intermediate roller cages 10 in the case of the roller nut with four roller cages, shown in FIG. 5.

Figure 6:
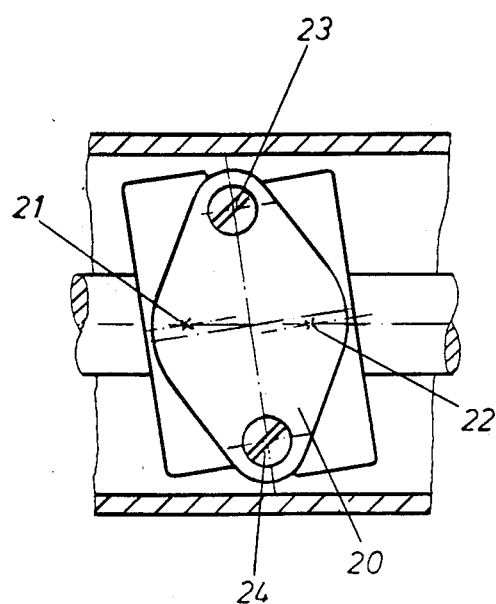
FIG. 6 is a side cut-away view of the roller nut with a flat pressure spring, predominantly for the roller nut with four roller rings.
Figure 7:
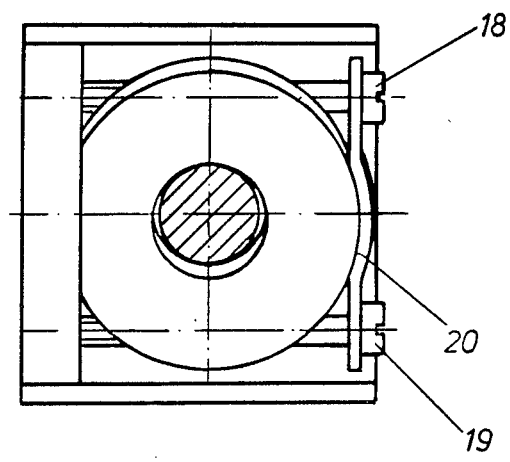
FIG. 7 is a front view of the roller nut of FIG. 6.

Another embodiment is shown in FIGS. 6 and 7. A flat spring 20, connected to the housing by means of two bolts 19, is mounted on both intermediate roller cages 10 of the four cage-roller nut so that this spring is in contact with two intermediate roller cages in two respective contact points 21 and 22. As shown in FIG. 6, these two contact points 21 and 22 lie outside the axis 23–24, and the pressure nevertheless is uniformly transmitted to the both roller cages 10 even when, due to manufacturing or assembling inaccuracies or wear, the contact points 21 and 22 are in different positions relative to the housing. The flat spring 20 has a trapezoidal configuration and can be formed so that it would contact the roller cages at the largest possible surface to uniformly transmit the pressure, for example with the interposition of a suitable pressure-distributing means. If necessary, a number of trapezoidal springs 20 can be employed.

To hold the roller cages 1, 10 and distance rings 14 together, grooves 25 are provided at two opposite ends of tubular housing 2. These grooves receive spring rings 26. If necessary to use longer roller nuts only one elongated piece of the tubular housing profile is employed and an additional tubular distance member is installed between two adjacent wedge-shaped rings 14.

If roller nuts with a greater, for example double thrust force, are to be used, four additional roller cages 1, 10 with corresponding six distance rings 14 can be mounted in a longer tubular housing in which a perfect static pressure distribution could be obtained and all roller cages 1,10 would be uniformly loaded.

The tubular housing 2 can be, for example rounded at the corners and formed with abutments or without the latter. The housing shape, shown in FIG. 3, has the advantage that the corners of the square-shaped tubular housing 2 can be used for attaching the housing to any machine, for example, fastening openings 27 can be formed on the front face of the housing.

It will be understood that each of the elements described above, or two or more together, may also find a useful application in other types of rolling nuts differing from the types described above.

While the invention has been illustrated and described as embodied in a rolling nut for transforming a rotary movement of the shaft to a thrust movement of the roller nut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rolling nut in combination with a smooth shaft for transforming a rotary movement of the shaft into a thrust movement of the nut, comprising a tubular housing; a plurality of annular roller cages, arranged in said housing and surrounding said shaft, said roller cages being arranged in said housing at an angle to each other and to an axis of the shaft, each roller cage having an inner annular surface engageable with an outer surface portion of said shaft, each roller cage also having an outer annular surface and two side surfaces; and a plurality of distance rings arranged in said housing and respectively interpositioned between the neighboring roller cates so that they abut only against the side surfaces of the neighboring roller cages but do not surround the outer annular surfaces of the latter, said distance rings comprising means for maintaining the axial relationship of the roller cages relative to each other and to the shaft axis, a position of each of said distance rings in said housing being changeable so that the direction of inclination of each of said roller cages to the axis of the shaft can be changed and a respective roller cage can be adjusted to a desired direction of the thrust movement.

2. The rolling nut as defined in claim 1, wherein two lateral roller cages and at least one intermediate roller cage therebetween are arranged in said housing.

3. The rolling nut as defined in claim 2, wherein said housing has an inner surface which is formed with supporting portions on which said lateral roller cages are supported without pressure.

4. The rolling nut as defined in claim 3, wherein each of said distance rings is wedge-shaped.

5. The rolling nut as defined in claim 4, wherein each of said distance rings has two lateral opposite surfaces, said opposite surfaces including therebetween an angle corresponding to a pitch angle of the thrust movement of the nut.

6. The rolling nut as defined in claim 5, wherein two wedge-shaped distance rings are positioned between said intermedimate roller cage and each of said lateral roller cages.

7. The rolling nut as defined in claim 6, wherein said housing has two opposite end portions, each of said end portions enclosing one of said distance rings, said one distance ring being arranged in contact with a respective lateral roller cage.

8. The rolling nut as defined in claim 2, further including means for producing a thrust force in the rolling nut, said means being applied on said intermediate roller cage.

9. The rolling nut as defined in claim 8, wherein said means include a pressing bolt and a pressure-distributing elastic intermediate member positioned between said pressing bolt and said intermediate roller cage.

10. The rolling nut as defined in claim 8, wherein said means includes a trapezoidal flat spring arranged in contact with said intermediate roller cage.

11. The rolling nut as defined in claim 7, wherein said housing has at said end portions annular grooves.

12. The rolling nut as defined in claim 11, further including spring rings insertable in said grooves and play-free securable therein.

* * * * *